United States Patent [19]

Balon et al.

[11] Patent Number: 5,411,416
[45] Date of Patent: May 2, 1995

[54] DOCKING CONNECTOR UNIT

[75] Inventors: Gary D. Balon, Hershey; Ira J. Wells, York, both of Pa.

[73] Assignee: The Whitaker Corporation, Wilmington, Del.

[21] Appl. No.: 283,111

[22] Filed: Jul. 29, 1994

[51] Int. Cl.[6] .......................................... H01R 25/00
[52] U.S. Cl. ................... 439/639; 439/540; 439/654
[58] Field of Search ................ 439/540, 59, 62, 65, 439/79, 638–640, 654

[56] References Cited

U.S. PATENT DOCUMENTS

| | | | |
|---|---|---|---|
| 3,963,300 | 6/1976 | Patton et al. | 339/156 R |
| 3,990,763 | 11/1976 | Kress | 339/155 R |
| 4,343,528 | 8/1982 | Lucius et al. | 339/198 G |
| 4,853,830 | 8/1989 | Corfits et al. | 361/391 |
| 4,923,411 | 5/1990 | Hayashi et al. | 439/540 |
| 4,944,698 | 7/1990 | Siemon et al. | 439/676 |
| 4,958,889 | 9/1990 | Boyle et al. | 312/208 |
| 4,978,949 | 12/1990 | Herron et al. | 340/711 |
| 4,986,763 | 1/1991 | Boyle | 439/165 |
| 5,019,465 | 5/1991 | Herron et al. | 429/97 |
| 5,028,025 | 7/1991 | Herron et al. | 248/185 |
| 5,030,128 | 7/1991 | Herron et al. | 439/372 |
| 5,125,854 | 6/1992 | Bassler et al. | 439/607 |
| 5,192,226 | 3/1993 | Wang | 439/502 |
| 5,196,993 | 3/1993 | Herron et al. | 361/393 |
| 5,217,386 | 6/1993 | Ohsumi et al. | 439/364 |
| 5,217,394 | 6/1993 | Ho | 439/620 |
| 5,219,294 | 6/1993 | Marsh et al. | 439/79 |
| 5,286,210 | 2/1994 | Kilsdonk et al. | 439/95 |
| 5,290,178 | 3/1994 | Ma | 439/652 |

Primary Examiner—Larry I. Schwartz
Assistant Examiner—Jill DeMello

[57] ABSTRACT

A docking connector unit for connecting portable personal computers to various peripheral input/output (I/O) devices such as keyboard, monitor, printer, modem and mouse, comprises, in a first mode, two docking unit assemblies, one of which connects to the I/O ports of a computer, and comprises matching I/O ports and one component of a two-component consolidated electrical connector; the other of which comprises the other component of a two-component consolidated electrical connector, and I/O ports which duplicate the I/O ports of the computer. In a second mode, the first docking unit assembly is in effect permanently installed in the computer, so that the I/O ports of the computer are consolidated as one component of a two-component consolidated electrical connector. In the second mode, the docking connector unit of the invention comprises a component of a two-component consolidated electrical connector to match the component permanently installed in the computer, and I/O ports which substitute for the I/O ports of the computer. In either event, a high-density (at least about 25 conductors per square centimeter) consolidated electrical connector is preferred for use. The device provides for ease of disconnecting a collection of peripheral I/O equipment from a computer, and reconnecting either the same or another similarly configured computer to the same collection of peripheral I/O equipment.

14 Claims, 4 Drawing Sheets

DOCKING CONNECTOR UNIT

FIELD OF THE INVENTION

This invention relates to a docking connector unit. More particularly, it relates to a docking connector unit for connecting portable personal computers to various peripheral input/output (I/O) devices such as keyboard, monitor, printer, modem and mouse.

DESCRIPTION OF THE PRIOR ART

The central processing units (CPUs) of personal computers are connected to peripheral I/O devices or equipment, such as keyboard, monitor, printer, modem and mouse, by cables. In order to allow flexibility of operation through the use of different types of equipment, to allow the connection of several computer CPUs to a single I/O device such as a printer, and to allow the transportation of the computer CPU without all of the peripheral I/O equipment (such as is in the case of a portable computer), the cables are usually connected by means of separable connectors, each of which is composed of mating male and female components, each of which components contains a number of individual electrical conductors for connection to corresponding individual electrical conductors in the matching component. A single collection of I/O equipment may be shared with multiple computers, such as a desk unit computer and a portable computer such as a notebook computer.

When multiple computers share the same collection of equipment, all the equipment must be disconnected, and connected to another computer. Likewise, when it is desired to transport a portable computer, all the equipment must be disconnected. Traditionally this disconnection and connection has been done a single cable at a time, which is time consuming and leads to wear on the individual cable connectors.

There have been attempts to gang together all of the multiple, separate connectors for simultaneous mated connection with mating connectors in a computer. See, for example, U.S. Pat. No. 5,030,128, issued Jul. 9, 1991, to Matthew Herron et al. Disadvantage of this approach are that (1) the connectors must be manufactured with precise alignments to connect them simultaneously, and (2) a relatively high force is required to connect the connectors simultaneously, which exceeds the strength of a misaligned conductor, and can result in damage to the misaligned conductor. Even though the conductors may have been correctly aligned originally, individual conductors or groups of conductors can become misaligned with use. A sample bar of standard I/O peripheral devices was constructed, and it was found that a force of between 35 and 85 pounds (about 15 to 38 megadynes) was required to connect all of the I/O ports simultaneously. An object of the present invention, therefore, is to reduce the required force to connect a collection of I/O ports simultaneously.

There is often a need for more room for I/O connections to a computer CPU. One traditional approach to meeting this need is to use individual, high-density, small-size connectors for each I/O port. Individual, high-density, small-size connectors are custom made, expensive, and sole-sourced. They are also not as durable as larger connectors, usually not completely tooled, and not available in all configurations.

Another solution to the space-limitation problem is to limit the number of I/O ports provided. This solution, however, limits the configurability and marketability of the product.

Another solution is to custom configure the I/O ports to each application. Custom configuration of the I/O ports must be done inside the CPU case, and requires re-configuration each time the unit is to communicate with a new protocol.

SUMMARY OF THE INVENTION

The present invention provides an adaptor that converts multiple connectors into a single docking connector unit. Each of the pieces of peripheral equipment is connected indefinitely to the docking connector unit, and the docking connector unit is connected with the computer CPU, i.e., interposed between the computer CPU and the peripheral equipment.

In one mode of the invention, the docking connector unit comprises two docking unit assemblies, one of which (the "proximal docking unit assembly") is proximal to the computer CPU, and is intended for indefinite attachment to the computer CPU, and the other of which (the "distal docking unit assembly") is further from the computer CPU, and is intended for indefinite attachment to the collection of I/O equipment.

In the first mode of the invention, the computer CPU is provided with traditional multiple I/O ports. The proximal docking unit assembly comprises I/O ports which match (i.e., mate with) the I/O ports of the computer CPU, and one component of a two-component, consolidated, preferably high-density, electrical connector. The distal docking unit assembly comprises the other component of the two-component, consolidated, preferably high-density, electrical connector, and I/O ports which duplicate the I/O ports of the computer CPU (i.e., mate with cables which would also mate with the I/O ports of the computer CPU).

During operation, the matching I/O ports of the proximal docking unit assembly are mated to the I/O ports of the computer CPU, and permanently electrically connected to the first component of the two-component consolidated electrical connector. By "permanently electrically connected", it is meant that the components are connected by a connection which is not intended to be broken during the ordinary course of operation of the computer, but which may of course be broken and reconnected as necessary for repair of the computer or for replacement of components as necessary. Permanent electrical connection is accomplished, for example, by wires, a printed circuit, or a combination of wires and a printed circuit, not shown.

The first component of the two-component consolidated electrical connector, in the proximal docking unit assembly, connects to the second component of the two-component consolidated electrical connector, in the distal docking unit assembly. The second component of the two-component consolidated electrical connector is permanently electrically connected to the I/O ports which duplicate the I/O ports of the computer CPU. The cables of the collection of I/O equipment are mated with the I/O ports of the distal docking unit assembly which duplicate the I/O ports of the computer CPU.

When it is desired to disconnect the collection of I/O equipment from the computer CPU, the two-component consolidated electrical connector is disconnected, allowing the computer CPU to be transported or allowing another computer with another proximal docking unit assembly, or outfitted for the second mode of the invention as described below, to be connected to the second component of the two-component consolidated electrical connector in the distal docking unit assembly, and thus to the collection of I/O equipment.

In the second mode of the invention, the computer CPU is functionally provided with a permanent proximal docking unit assembly. This may be done either by permanently attaching the proximal docking unit assembly to the traditional multiple I/O ports, or by eliminating the traditional multiple I/O ports, and permanently electrically connecting the CPU components, which would otherwise be permanently electrically connected to the traditional multiple I/O ports, directly to the first component of the two-component consolidated electrical connector. Operation and disconnection occur in the same manner as in the first mode of the invention.

The CPU components may also be provided with dual connections, both to traditional I/O ports and to the first component of the two-component consolidated electrical connector.

In either mode, only a single docking connector is required to connect and disconnect with the computer CPU, instead of requiring connection and disconnection of each of the multiple, separate connectors. The docking connector is capable of multiple connections and disconnections without excessive contact wear, as compared to the multiple, separate connectors that wear off gold plating when subjected to multiple connections and disconnections.

The docking connector provides greater durability of I/O connections, allows the use of lower amounts of force during connector connection and disconnection, utilizes industry standard connector platforms, and organizes cables.

DETAILED DESCRIPTION

The invention is described in detail by reference to the drawings.

Figure 1:
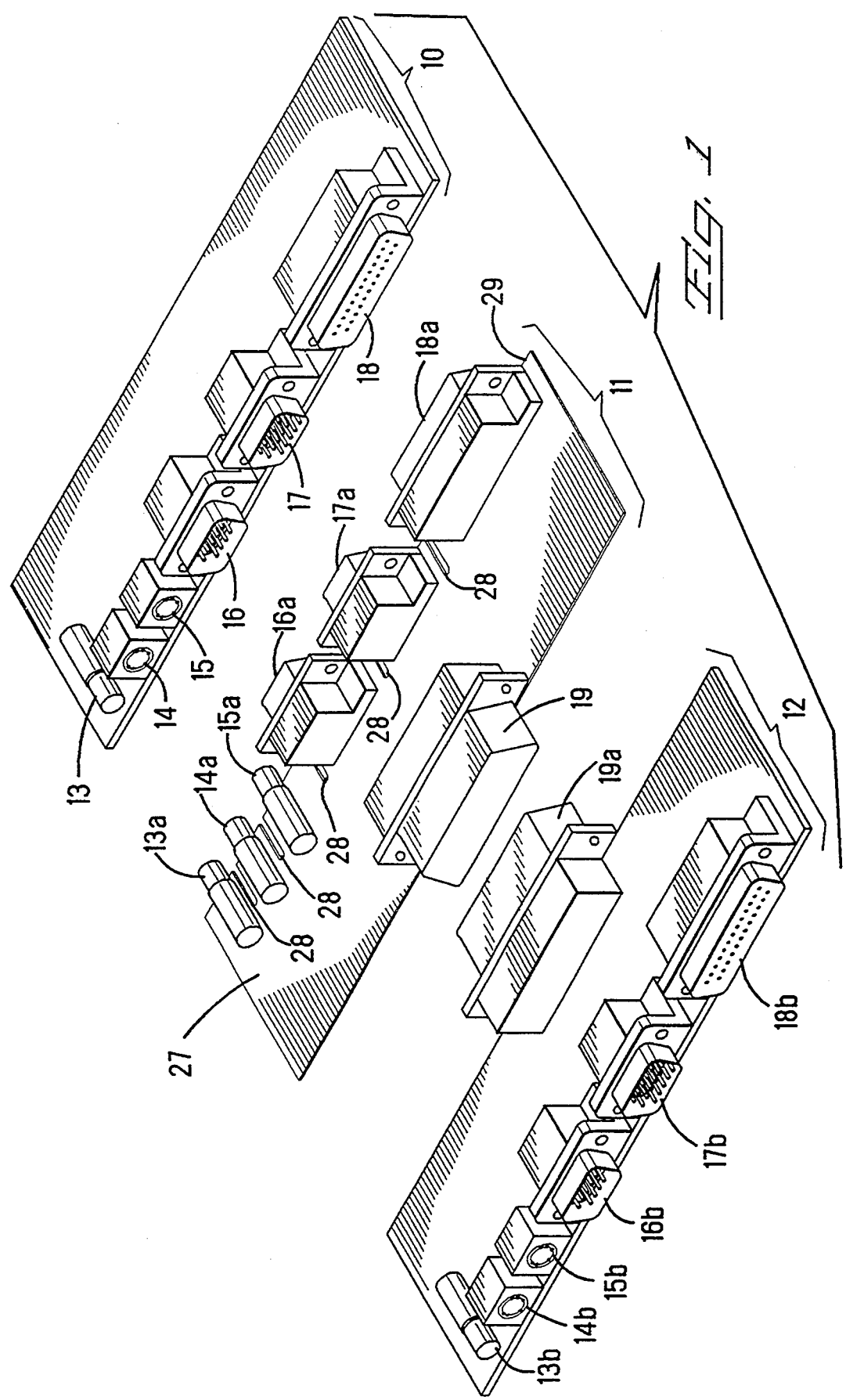
FIG. 1 is a schematic isometric drawing of a docking connector according to the first mode of the invention, illustrating the computer I/O port section, the proximal docking unit assembly, and the distal docking unit assembly.

Referring first to FIG. 1, there is shown a docking connector according to the first mode of the invention, illustrating the computer I/O port section (10), the proximal docking unit assembly (11), and the distal docking unit assembly (12). Circuitry is not shown, in order to show more clearly the underlying structure. The computer I/O port section need not comprise any particular minimum or maximum number of I/O ports, and a typical configuration of I/O ports 13–18 is shown.

Each of I/O ports 13–18 is permanently electrically connected to the appropriate component of the computer CPU, by conventional means (not shown).

In the first mode of the invention, the proximal docking unit assembly 11 comprises matching I/O ports 13a–18a, which match I/O ports 13–18 of the computer CPU, and one component 19 of a two-component, consolidated, preferably high-density, electrical connector. The matching I/O ports 13a–18a are permanently physically and electrically connected to the first component 19 of the two-component consolidated electrical connector. Permanent physical connection is accomplished, for example, by mounting both the matching I/O ports 13a–18a and the component 19 of the two-component consolidated electrical connector on a chassis board. With reference to FIG. 1, the assembly 11 comprises a flexible flat circuit 27 on which the ports 13a–18a are mounted. Elongated notches 28 through the flat circuit 27 divide an edge 29 of the flat circuit 27 into individual flexible areas of the flat circuit 11 along the edge 29. Each of the ports 13a–18a is mounted on a corresponding individual flexible area. The individual areas are independently flexible to adjust the positions of the ports 13a–18a for connection to the appropriate components 13–18.

The two-component consolidated electrical connector is preferably a high-density electrical connector, i.e., an electrical connector which has a conductor density, at the point of connection, of at least 25 electrical conductors per square centimeter. As used herein, "conductor density" and "density" always refer to conductor density at the point of connection. It is preferred that the density be at least 50 electrical conductors per square centimeter. Two particularly preferred commercially available connectors have center-to-center spacings of 1.9 and 1.27 millimeters, respectively, between adjacent electrical conductors, both of which spacings result in densities in excess of 25 conductors per square centimeter. Lower density consolidated electrical connectors can be used if such are desired and if they can withstand the force of repeated insertions and extractions to which the connector is subjected, but higher densities are preferred, as they reduce the force necessary to connect all of the I/O devices simultaneously.

It is preferred that the electrical connector which connects the proximal and distal docking unit assemblies have at least 50 conductors, more preferably at least 100 conductors, and still more preferably at least 198 conductors. The most highly preferred electrical connector to connect the proximal and distal docking unit assemblies is a high-density electrical connector having 198 conductors, details of which are described in U.S. Pat. No. 5,219,294, issued Jun. 15, 1993, to Edward K. Marsh et al.; U.S. patent application Ser. Nos. 07/977,800, filed Nov. 17, 1992, by Earl W. McCleerey et al.; and in 07/994,669, filed Dec. 22, 1992, by Edward K. Marsh et al., the disclosures of all of which are incorporated by reference. A suitable high-density electrical connector is also described in U.S. Pat. No. 5,066,240, issued Nov. 19, 1991, to Gary J. Verdun.

In the first mode of the invention, the distal docking unit assembly 12 comprises the second component 19a of the two-component consolidated electrical connector, and I/O ports 13b–18b, which duplicate the I/O ports of the computer. The second component 19a of the two-component consolidated electrical connector is permanently electrically connected to the duplicating I/O ports 13b–18b, by conventional means (not shown).

The electrical connections are such that they electrically connect each conductor of each I/O port which duplicates an I/O port of the computer, to the corresponding conductor of the corresponding duplicated I/O port of the computer, when the two components of the two-component consolidated electrical connector are connected.

Figure 2:
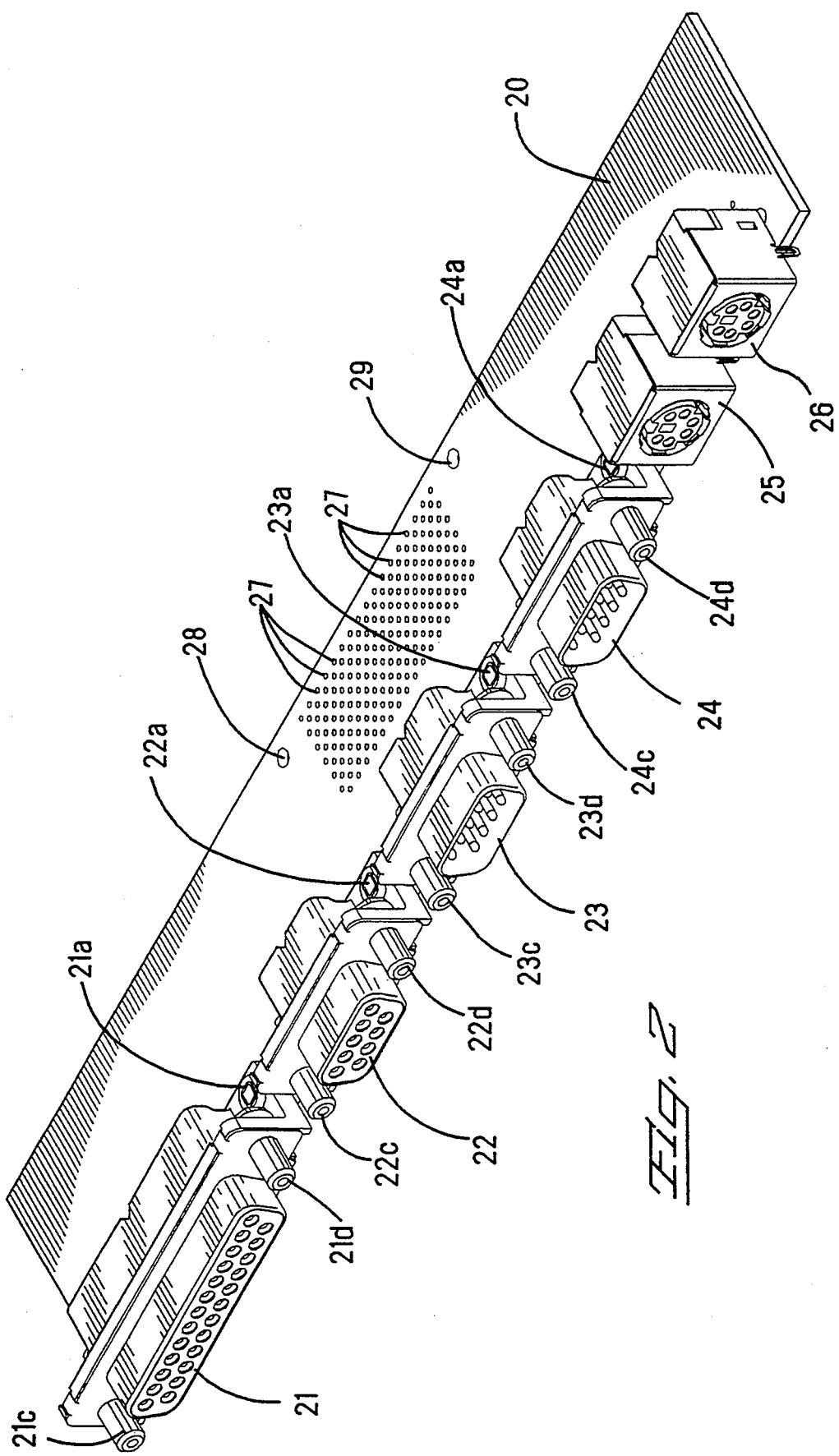
FIG. 2 is a schematic isometric drawing of a distal docking unit assembly (or of the only docking unit assembly, according to the second mode of the invention).

FIG. 2 is a schematic isometric drawing of a distal docking unit assembly (or of the only docking unit assembly, according to the second mode of the invention), with some parts missing in order to show the underlying structure. On the chassis board 20 of the distal docking unit assembly (in the case of the first mode of the invention) or the only docking unit assembly (in the case of the second mode of the invention), there are mounted I/O ports 21–26, for example by mounting means 21a–26a, 21b–26b, 25c and 26c (see FIG. 3). I/O ports 21–26 may be provided with means 21c–24c and 21d–24d for securing mating I/O ports of I/O devices. Chassis board 20 is also provided with holes 27, which are mounted with conductors (not shown) for connection to the consolidated electrical connector (not shown). Chassis board 20 is also provided with holes 28 and 29, for physically attaching the consolidated electrical connector.

Figure 3:
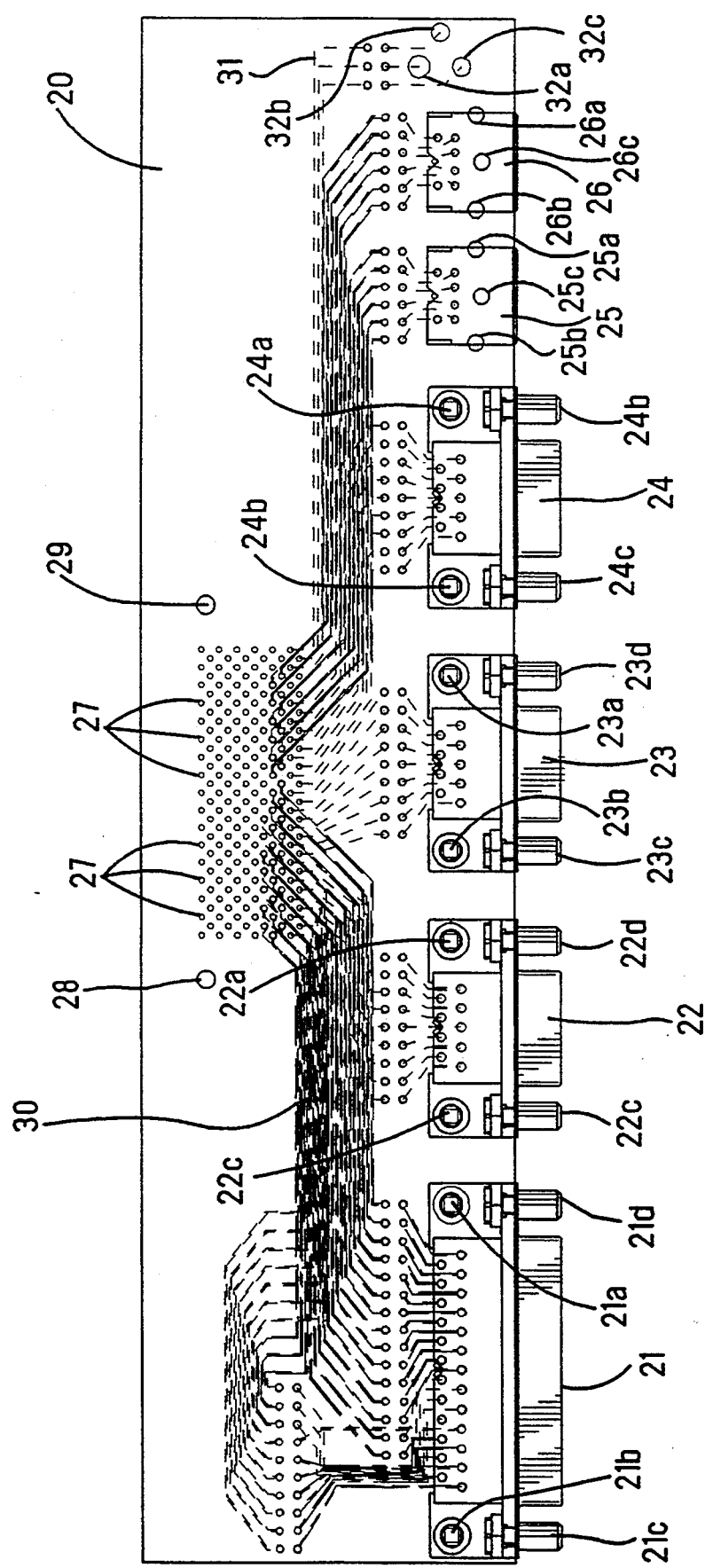
FIG. 3 is a plan view of a docking unit assembly, similar to that shown in FIG. 2, but with printed circuitry from the I/O ports of the to terminals of the consolidated electrical connector shown.

FIG. 3 is a plan view of a docking unit assembly, similar to that shown in FIG. 2, but with printed circuitry 30 from the I/O ports of the to terminals of the consolidated electrical connector shown. In addition to the circuitry for the I/O ports, chassis board 20 may be provided with circuitry 31 leading to leads 32a, 32b and 32c, to which are connected a direct current alternate power supply (not shown).

Figure 4:
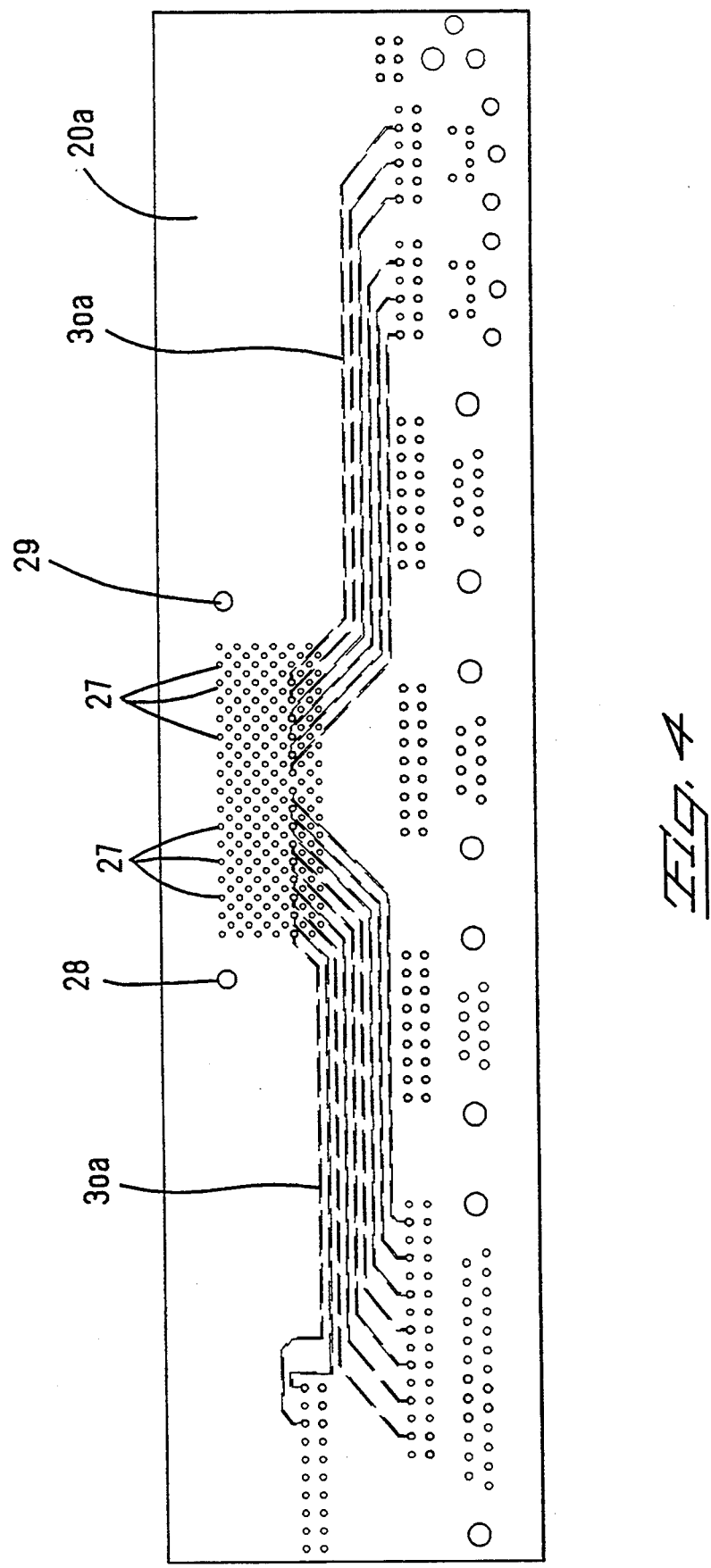
FIG. 4 is a plan view of a docking unit assembly, similar to that shown in FIG. 3, but showing only one layer of a multi-layer chassis board, and the portion of the circuitry associated with that layer.

It will be noted that the printed circuitry 30 in FIG. 3 includes circuits which are shown (in the two dimensional drawing of FIG. 3) as intersecting. In order for these circuits to not intersect in fact, it is frequently preferred to construct chassis board 20 as a multi-layer board, with only a limited number of non-intersecting circuits being present on any particular level. FIG. 4 is a plan view of one layer 20a of a multi-layer chassis docking unit assembly, similar to that shown in FIG. 3, but showing only one layer of the chassis board, and the portion of the circuitry 30a associated with that layer.

It will also be noted that in the embodiment illustrated in FIG. 3, only 67 conductors are shown connecting the I/O ports 21–26 and leads 32a, 32b and 32c to leads for connection to the consolidated electrical connector, although the consolidated electrical connector has provision for 198 leads (the preferred consolidated electrical connector being provided with 6 rows of 33 leads each). It will usually be the case that some of the leads of the consolidated electrical connector are not used, and this causes no problem. The additional leads are available in the event that it is later desired to reconfigure the docking unit assembly to use more I/O devices and consequently more conductors. By always using a standard consolidated electrical connector with provision for 198 leads, moreover, interchangeability of computers and components is maximized.

The invention has been illustrated with examples which illustrate, but are not intended to limit the invention. Those skilled in the art will be aware of other variations, within the scope of the following claims.

We claim:

1. A docking connector unit for connecting a personal computer provided with input/output ports to input/output devices, comprising:

(a) a proximal docking unit assembly, comprising
  (1) input/output ports which match the input/output ports of the computer, and
  (2) a first component of a two-component consolidated electrical connector, the matching input/output ports being permanently physically and electrically connected to the first component of the two-component consolidated electrical connector; and (b) a distal docking unit assembly, comprising
  (1) the second component of the two-component consolidated electrical connector, and
  (2) input/output ports which duplicate the input/output ports of the computer, the second component of the two-component consolidated electrical connector being permanently physically and electrically connected to the duplicating input/output ports;
    the permanent electrical connections of the proximal and distal docking unit assemblies being arranged in such a manner as to electrically connect each conductor of each input/output port which duplicates an input/output port of the computer, to the corresponding conductor of the corresponding duplicated input/output port of the computer, when the two components of the two-component consolidated electrical connector are connected.

2. A docking connector unit according to claim 1, wherein the two-component consolidated electrical connector is a high-density electrical connector.

3. A docking connector unit according to claim 1, wherein the two-component consolidated electrical connector has a conductor density of at least about 50 conductors per square centimeter.

4. A docking connector unit according to one of claims 1, 2 or 3, wherein the two-component consolidated electrical connector has at least 50 conductors.

5. A docking connector unit according to one of claims 1, 2 or 3, wherein the two-component consolidated electrical connector has at least 100 conductors.

6. A docking connector unit according to one of claims 1, 2 or 3, wherein the two-component consolidated electrical connector has at least 198 conductors.

7. A docking connector unit according to one of claims 1, 2 or 3, wherein the two-component consolidated electrical connector has 198 conductors.

8. A docking connector unit for connecting a personal computer provided with a first component of a two-component consolidated electrical connector as a consolidated input/output port for a plurality of peripheral input/output devices, comprising:

(a) a matching component of a two-component consolidated electrical connector, which matches the component of a two-component consolidated electrical connector provided as the consolidated input/output port for a plurality of peripheral input/output devices of the personal computer; and (b) input/output ports which match the input/output ports of a plurality of peripheral input/output devices, which are to be connected to the computer, the matching component of the two-component consolidated electrical connector being permanently physically and electrically connected to the matching input/output ports;
  the permanent electrical connections of the docking unit being arranged in such a manner as to electrically connect each conductor of each input/output port which matches an input/output port of a peripheral input/output device to be connected to the computer, to the corresponding conductor of the consolidated input/output port of the computer, when the two components of the two-component consolidated electrical connector are connected.

9. A docking connector unit according to claim 8, wherein the two-component consolidated electrical connector is a high-density electrical connector.

10. A docking connector unit according to claim 8, wherein the two-component consolidated electrical connector has a conductor density of at least about 50 conductors per square centimeter.

11. A docking connector unit according to one of claims 8, 9 or 10, wherein the two-component consolidated electrical connector has at least 50 conductors.

12. A docking connector unit according to one of claims 8, 9 or 10, wherein the two-component consolidated electrical connector has at least 100 conductors.

13. A docking connector unit according to one of claims 8, 9 or 10, wherein the two-component consolidated electrical connector has at least 198 conductors.

14. A docking connector unit according to one of claims 8, 9 or 10, wherein the two-component consolidated electrical connector has 198 conductors.

* * * * *